United States Patent [19]

Fernquist et al.

[11] Patent Number: 4,783,903

[45] Date of Patent: Nov. 15, 1988

[54] METHOD OF FORMING A BLIND SOLDER JOINT IN AN IGNITION COIL

[75] Inventors: James F. Fernquist, Farmington Hills; Donald E. Ellison, St. Clair Shores, both of Mich.

[73] Assignee: United Technologies Automotive, Inc., Dearborn, Mich.

[21] Appl. No.: 74,378

[22] Filed: Jul. 16, 1987

[51] Int. Cl.[4] ............................................. H01F 7/06
[52] U.S. Cl. .................................... 29/602.1; 29/854; 29/878; 29/879; 219/85 BM; 228/179; 336/107; 439/874
[58] Field of Search ...................... 29/602 R, 854–856, 29/843, 878, 879; 219/85 BA, 85 BM, 85 R, 85 M; 228/165, 179, 248; 439/874; 123/634; 336/105, 107

[56] References Cited

U.S. PATENT DOCUMENTS

| | | | |
|---|---|---|---|
| 2,457,599 | 12/1948 | Pessel | 29/879 |
| 3,520,055 | 7/1970 | Jannett | 228/179 |
| 3,926,360 | 12/1975 | Moister, Jr. | 228/248 |
| 3,945,114 | 3/1976 | Siden et al. | 228/179 |
| 4,377,024 | 3/1983 | Saperstein | 228/248 |
| 4,528,971 | 7/1985 | Hittinger et al. | 123/634 |

Primary Examiner—P. W. Echols

[57] ABSTRACT

A method of forming a solder joint between a cup shaped high voltage terminal and a secondary lead extending from a secondary coil within a plastic case of an ignition coil. The steps include securing a solder paste to an inwardly extending end of the high voltage terminal, positioning the secondary coil lead relative to the solder paste, and heating the joint without making physical contact therewith to promote melting of the solder to secure and electrically connect the desired components.

12 Claims, 2 Drawing Sheets

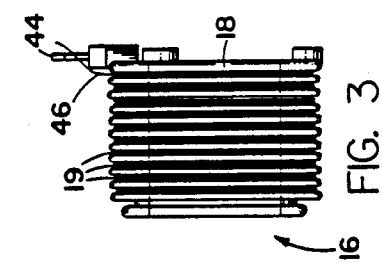
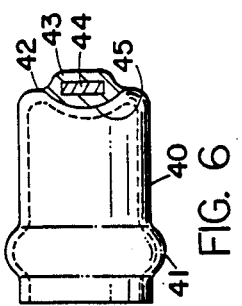
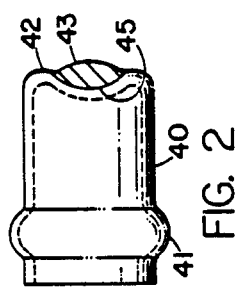
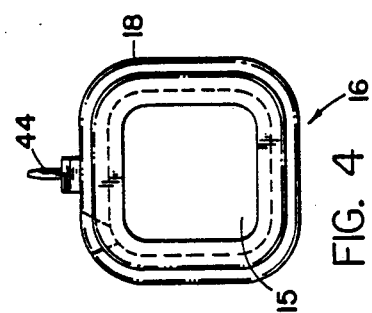
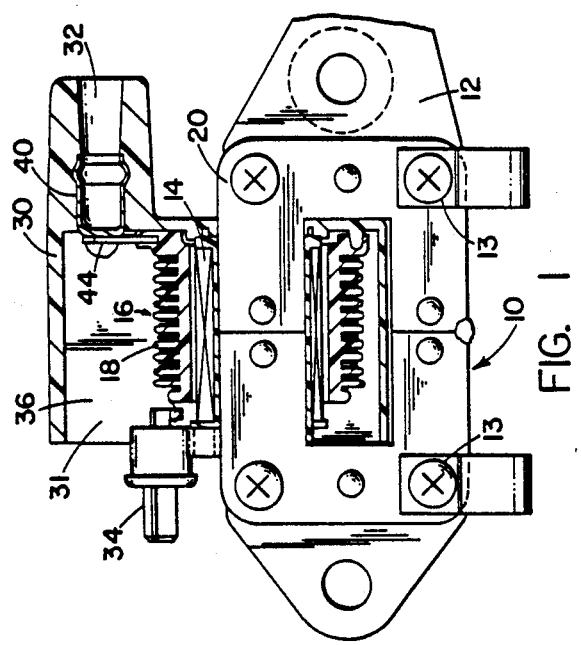

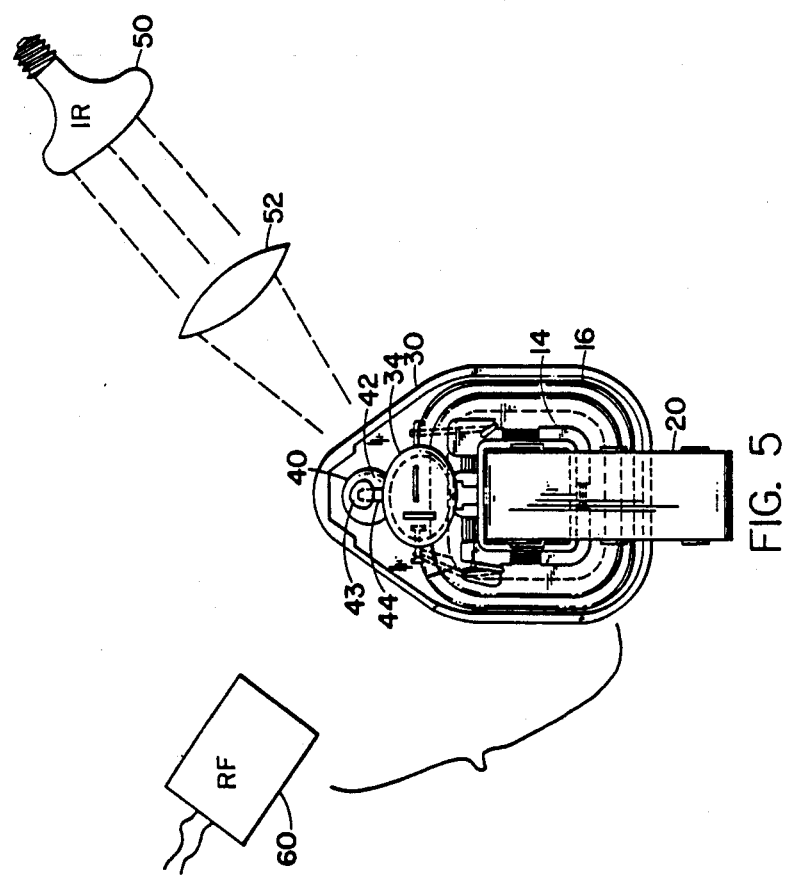

METHOD OF FORMING A BLIND SOLDER JOINT IN AN IGNITION COIL

TECHNICAL FIELD

The present invention concerns a method of forming a solder joint at a position within an assembly that is not directly accessible for the application of heat. More specifically, the present invention is directed to a method of soldering two components within a plastic housing without physically contacting either component.

BACKGROUND OF THE INVENTION

Ignition coils as are suitable for use with internal combustion engines act to provide a high voltage level electrical current which may be supplied to a spark plug. The current supplied is at a sufficient potential to create an arc across the spark plug gap to ignite the gasoline in the cylinder to power a piston of the internal combustion engine. In order to create this high voltage power source, a primary coil and a secondary coil are positioned relative to each other such that high voltage is generated in the secondary coil.

A particular type of ignition coil has a plastic housing which defines a high voltage opening in which a cup shaped high voltage terminal is secured. The housing additionally includes a main opening in which the primary and secondary coils are secured and wherein they are encapsulated within an epoxy material to pot the entire structure. With such a structure, however, it is necessary to make an electrical connection between an extending lead from the secondary coil and the high voltage terminal. This solder connection is made within the interior of the housing and is in effect a blind joint.

The previous method of performing this solder joint included melting a bead of solder of significant size and allowing this bead to become affixed to the inwardly extending end of the high voltage terminal and then inserting the terminal into the terminal opening in the housing. The secondary coil was then positioned in the main opening with secondary lead contacting the solder bead. The operator would manually hold the secondary coil in position while a heated rod is inserted into the center of the cup shaped high voltage terminal to make physical contact therewith. The heated rod would act to re-melt the bead of solder on the terminal and by holding the secondary coil in position relative to the melted solder and against any force applied by the heated rod, a solder joint could be formed.

However, in the above described method it is necessary to position the ignition coil in the desired orientation, to insert the heated rod into the high voltage terminal and to simultaneously manipulate the secondary coil to be aligned with the solder bead and to maintain the secondary lead in contact with the solder bead as physical force is applied within the high voltage terminal by the heated rod. Although effective, this method requires several manual steps, a skilled operator and, of necessity, must use a relatively large solder bead.

The hereinafter described method accomplishes soldering using noncontact soldering methods and solder paste. In such a manner, the quantity of soldering material utilized as well as the number of steps necessary to perform the soldering operation are reduced.

SUMMARY OF THE INVENTION

It is an object of the present invention to provide a method for forming a blind solder joint between a high voltage terminal and the lead of the secondary coil within a plastic housing of an ignition coil.

It is a yet further object of the present invention to provide an improved method for forming a blind solder joint using a reduced amount of solder material.

It is another object of the present invention to provide an improved assembly method wherein the secondary coil need not be manually positioned during the soldering operation.

It is a further object of the present invention to provide means for making a blind solder joint wherein heat is directed to a specific location to form the solder joint without damaging plastic members in which the components to be soldered are secured.

It is another object of the present invention to provide a safe, economical, reliable, and easy to duplicate method of assembling an ignition coil using a blind solder joint.

Other objects will be apparent from the description to follow and the appended claims.

The above objects are achieved according to a preferred embodiment of the invention by the method of forming a solder joint between a cup shaped high voltage terminal to be inserted within a high voltage opening in a plastic case of an ignition coil and a projecting secondary lead extending from a secondary coil inserted within a main opening in the case. The steps of the method include securing solder paste to the inwardly extending end of the high voltage terminal, positioning the high voltage terminal within the high voltage opening in the case of the ignition coil with the inwardly extending end projecting to the main opening in the case. The secondary coil is then placed in the main opening of the housing with the secondary lead positioned to contact the solder paste secured to the high voltage terminal. The last step is heating the inwardly extending end of the high voltage terminal, the secondary lead and the solder paste to melt the solder paste to form a solder joint therebetween, said heating being accomplished without applying physical pressure to the high voltage terminal. Heating may be accomplished by using infrared radiation, radio frequency radiation, or focused streams of hot air among other methods.

Also disclosed is a process for electrically connecting the inwardly extending end of a cup shaped high voltage terminal secured within a case to a projecting lead from a secondary coil also secured within the case, said case having a main opening extending in a first direction in which the secondary coil is secured and a high voltage terminal opening projecting in an opposite direction in which the high voltage terminal is secured, said projecting lead and said high voltage terminal being positioned adjacent each other within the interior of the case. The steps of the process include affixing a low melting temperature solder paste to the inwardly extending end of the high voltage terminal, positioning the high voltage terminal within the high voltage terminal opening with the inwardly extending end positioned to be electrically engaged by a secondary lead to be positioned within the case, placing the secondary coil within the main opening of the case with the secondary lead positioned adjacent the inwardly extending end of the high voltage terminal and melting the solder paste to form a solder joint between the secondary lead and the high voltage terminal by using noncontact heating means.

BRIEF DESCRIPTION OF THE DRAWINGS

FIG. 1 is a partially sectioned end view of an ignition coil showing the relative positioning between the high voltage terminal and the secondary coil.

FIG. 2 is a side view of a high voltage terminal.

FIG. 3 is a side view of a secondary coil.

FIG. 4 is an end view of the secondary coil of FIG. 3.

FIG. 5 is an end view of the ignition coil of FIG. 1.

FIG. 6 is a partial sectional view showing relative positioning of the high voltage terminal and the secondary lead when soldered.

PREFERRED EMBODIMENT OF THE INVENTION

The invention herein will be described with reference to making a blind solder joint within a specific ignition coil structure. It is to be understood that other types of blind solder joints and similar applications could likewise use the techniques presented herein.

Reference will be made herein to a low melting temperature solder paste. This solder paste is a commercially available material made by Alpha Metals, Inc., 600 Rte. 440, Jersey City, N.J. 07304, and Kester Solder Company, Division of Litton Industries, 4201 Wrightwood Avenue, Chicago, Ill. 60639, typically having a melting temperature in the range of 270° to 300° F. and being sufficiently sticky or having sufficient adherent qualities that it directly adheres to the high voltage terminal and to the secondary lead of the secondary coil when positioned adjacent thereto. The case as described hereafter is made of a plastic material typically having a melting temperature of 350° to 400° F. Hence, by the use of the solder having a sufficiently lower melting temperature, it is possible to make the solder joint without affecting the structural integrity of the plastic case. A typical solder paste having a higher melting temperature may also be suitable.

Referring first to FIG. 1, there may be seen ignition coil 10 having bracket 12 to which coil core 20 is mounted. Bolts 13 help secure coil core 20 to bracket 12 and then may be utilized for mounting the ignition coil to the desired end use. Coil core 20 extends within the central opening of primary coil 14 which is located within the central opening of secondary coil 16. Secondary coil 16 includes a secondary bobbin 18 and secondary lead plate 44. Plastic case 30 is shown extending around the primary coil, the secondary coil, and a portion of the coil core and defines main opening 31 in which the primary and secondary coils are positioned. The main opening in addition to the primary and secondary coils and the coil core is filled with epoxy 36 to encapsulate these components within the opening.

Case 30 additionally includes a portion which extends to define a high voltage opening 32 which is generally cylindrical in configuration. High voltage terminal 40 is secured within high voltage opening 32 and has an inward end projecting to be positioned relative to secondary lead plate 44 of the secondary coil. It is between these two elements where the solder joint is formed. Terminals 34 for supplying power to the primary and secondary coils are additionally shown.

FIG. 2 shows high voltage terminal 40 being generally cylindrical in configuration and having rib 41 which coacts with a mating indentation formed in the high voltage opening of the case to secure the high voltage terminal in position. The inwardly extending end of high voltage terminal 40 is labeled abutment portion 42 and includes an indentation portion 45 in which solder paste 43 is placed. As previously indicated, the solder paste has adherent qualities and maintains itself within the indentation portion.

FIGS. 3 and 4 show side and end views of secondary coil 16. Secondary coil 16 is formed by winding an elongated electrical conductor about secondary bobbin 18 in myriad of turns such that the desired voltage level is generated in the secondary coil. The secondary windings which are formed from this continuous conductor are labeled secondary windings 19 and include a connecting winding 46 connecting the turns of the winding to secondary lead plate 44. Of course, it is not necessary to actually have a separate secondary lead plate and the connecting winding may be directly soldered to the high voltage terminal. As may be seen in FIG. 4, secondary bobbin 18 is generally rectangular in configuration and has a central opening 15 into which the primary coil may be positioned. Additionally, secondary lead plate 44 is shown extending upwardly for easy soldering with the high voltage terminal.

FIG. 5 shows an end view of the ignition coil of FIG. 1. The pyramidal configuration of case 30 is shown relative to the positionings of secondary coil 16 and primary coil 14. Coil core 20 is shown having a portion extending within both coils. Terminals 34 are also shown.

High voltage terminal 40 is shown towards the top of case 30 in the pyramidal portion and specifically abutment portion 42 extending into the main opening of the case is shown. Solder paste 43 secured at the end of the abutment opening is shown as is secondary lead plate 44 extending upwardly from the secondary coil to contact the high voltage terminal and the solder paste.

Additionally shown in FIG. 5 on the right-hand side is an infrared lamp 50 and lens 52. It is shown schematically to indicate the infrared heat energy supplied by lamp 50 may be focused by lens 52 to be concentrated on the area to be soldered to effect melting of the solder to secure the secondary lead plate to the high voltage terminal to provide a good electrical connection without providing sufficient heat energy to melt the case, the bobbin, or the other plastic components of the ignition coil.

On the left-hand side of the ignition coil as shown in FIG. 5 is a source of radio frequency energy. This RF source 60 is likewise positioned such that when it is energized, appropriate radio frequency radiation is focused at the solder joint. Additionally, a stream of hot air (not shown) could be focused in the same area on the exterior case or within the high voltage terminal to create the same effect.

In order to effect the solder joint as described herein, the high voltage terminal has an abutment portion and has an indentation portion formed therein. The solder paste in a very small amount is provided in this indentation portion. The secondary coil is inserted within the main opening of the case with the secondary lead plate extending to engage the solder paste. The structural dimensioning of the components located within the main opening help to secure the secondary coil in position. The slight adherence of the solder paste against the secondary lead additionally helps to secure the ignition coil in the desired postion. This minor bit of adherence in conjunction with the application of heat energy without physically contacting the solder joint, is sufficient to allow the solder to be melted and a good electrically conductive solder joint to be formed without the further necessity of requiring manual positioning of the secondary coil during the solder operation. As previously described, an external source of heat energy may be focused infrared radiation, focused radio frequency radiation, a hot air stream or the like.

The invention has been described with reference to a particular embodiment. It is to be understood by those skilled in the art that variations and modifications can be effected within the spirit and scope of the invention.

We claim:

1. A method of forming a solder joint between a cup shaped high voltage terminal to be inserted within a high voltage opening in a plastic case of an ignition coil and a projecting secondary lead extending from a secondary coil inserted within a main opening in the case which comprises the steps of:

securing an adherent solder paste to the inwardly extending end of the high voltage terminal;

positioning the high voltage terminal within the high voltage opening in the case of the ignition coil with the inwardly extending end projecting to the main opening in the case;

placing the secondary coil in the main opening of the case with the secondary lead positioned to contact the solder paste secured to the high voltage terminal; and heating the inwardly extending end of the high voltage terminal, the secondary lead and the solder paste to melt the solder paste to form a solder joint therebetween, said heating being accomplished without applying physical pressure to the high voltage terminal.

2. The method as set forth in claim 1 wherein the step of heating further comprises the step of heating the high voltage terminal, the secondary lead and the solder paste using focused infrared radiation.

3. The method as set forth in claim 1 wherein the step of heating further comprises the step of heating the high voltage terminal, the secondary lead and the solder paste using radio frequency radiation.

4. The method as set forth in claim 1 wherein the step of heating further comprises the step of heating the high voltage terminal, the secondary lead and the solder paste using focused streams of hot air.

5. The method as set forth in claim 1 wherein the step of securing includes the step of forming an indentation in the inwardly extending end of the high voltage terminal and wherein the solder paste is secured within the indentation.

6. The method as set forth in claim 5 wherein the step of placing the secondary coil in the main opening includes the secondary coil being retained in position with the secondary lead engaged to the solder paste and wherein the solder paste is sufficiently adherent to help secure the secondary coil in position.

7. The method as set forth in claim 6 and further comprising the step of encapsulating the secondary coil within the case after the step of heating.

8. A process for electrically connecting the inwardly extending end of a cup shaped high voltage terminal secured within a case to a projecting lead from a secondary coil also secured within the case, said case having a main opening extending in a first direction in which the secondary coil is secured and a high voltage terminal opening projecting in an opposite direction in which the high voltage terminal is secured, said projecting lead and said high voltage terminal being positioned adjacent each other within the interior of the case which comprises the steps of:

affixing an adherent low melting temperature solder paste to the inwardly extending end of the high voltage terminal;

positioning the high voltage terminal within the high voltage terminal opening with the inwardly extending end positioned to be electrically engaged by the projecting lead from the secondary coil to be positioned within the case;

placing the secondary coil within the main opening of the case with the projecting lead positioned adjacent the inwardly extending end of the high voltage terminal; and melting the solder paste to form a solder joint between the projecting lead and the high voltage terminal by using noncontact heating means.

9. The process as set forth in claim 8 and further comprising the step of melting including radio frequency heating means.

10. The process as set forth in claim 8 and further comprising the step of melting including infrared heating means.

11. The process as set forth in claim 8 wherein the high voltage terminal includes an indentation portion and wherein the solder paste is affixed within the indentation portion.

12. The process as set forth in claim 11 wherein the step of placing the secondary coil includes making contact between the secondary lead and the solder paste to assist in securing the secondary coil in position prior to heating

* * * * *